(12) United States Patent
Wu et al.

(10) Patent No.: US 11,593,496 B2
(45) Date of Patent: Feb. 28, 2023

(54) DECENTRALIZED DATA PROTECTION SYSTEM FOR MULTI-CLOUD COMPUTING ENVIRONMENT

(71) Applicant: EMC IP Holding Company LLC, Hopkinton, MA (US)

(72) Inventors: Pengfei Wu, Shanghai (CN); Kun Wang, Beijing (CN); Stephen J. Todd, Shrewsbury, MA (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 280 days.

(21) Appl. No.: 15/959,386

(22) Filed: Apr. 23, 2018

(65) Prior Publication Data

US 2019/0325155 A1    Oct. 24, 2019

(51) Int. Cl.
*G06F 21/62* (2013.01)
*G06F 16/22* (2019.01)
*G06F 16/27* (2019.01)
*H04L 9/40* (2022.01)

(52) U.S. Cl.
CPC ...... *G06F 21/6218* (2013.01); *G06F 16/2255* (2019.01); *G06F 16/27* (2019.01); *H04L 63/20* (2013.01)

(58) Field of Classification Search
CPC .. G06F 21/6218; G06F 16/2255; G06F 16/27; G06F 16/16; G06F 16/182; G06F 21/64; H04L 63/20; H04L 63/10
See application file for complete search history.

(56) References Cited

U.S. PATENT DOCUMENTS

| 6,742,020 B1 * | 5/2004 | Dimitroff | G06F 16/27 709/217 |
| 8,868,508 B2 * | 10/2014 | Drobychev | G06F 16/27 707/652 |
| 8,930,648 B1 * | 1/2015 | Storer | G06F 3/067 711/154 |

(Continued)

OTHER PUBLICATIONS

P. Maymounkov et al., "Kademlia: A Peer-to-Peer Information System Based on the XOR Metric," International Workshop on Peer-to-Peer Systems, (IPTPS), Mar. 7-8, 2002, pp. 53-65.

(Continued)

*Primary Examiner* — Carl G Colin
*Assistant Examiner* — Hany S. Gadalla
(74) *Attorney, Agent, or Firm* — Ryan, Mason & Lewis, LLP (57) ABSTRACT

In a multi-cloud computing environment comprising a plurality of cloud platforms with each cloud platform comprising one or more nodes, a method maintains a decentralized metadata database framework, wherein each node comprises a decentralized metadata database component operatively coupled to each other decentralized metadata database component of the framework and wherein each of at least two of the decentralized metadata database components stores a set of metadata records corresponding to protected data stored across the plurality of cloud platforms. Further, the method manages one or more access requests directed to the protected data through one or more of the decentralized metadata database components of the framework.

20 Claims, 9 Drawing Sheets

800

802 — IN A MULTI-CLOUD COMPUTING ENVIRONMENT COMPRISING A PLURALITY OF CLOUD PLATFORMS WITH EACH CLOUD PLATFORM COMPRISING ONE OR MORE NODES, MAINTAIN A DECENTRALIZED METADATA DATABASE FRAMEWORK, WHEREIN EACH NODE COMPRISES A DECENTRALIZED METADATA DATABASE COMPONENT OPERATIVELY COUPLED TO EACH OTHER DECENTRALIZED METADATA DATABASE COMPONENT OF THE FRAMEWORK AND WHEREIN EACH OF AT LEAST TWO OF THE DECENTRALIZED METADATA DATABASE COMPONENTS STORES A SET OF METADATA RECORDS CORRESPONDING TO PROTECTED DATA STORED ACROSS THE PLURALITY OF CLOUD PLATFORMS

804 — MANAGE ONE OR MORE ACCESS REQUESTS DIRECTED TO THE PROTECTED DATA THROUGH ONE OR MORE OF THE DECENTRALIZED METADATA DATABASE COMPONENTS OF THE FRAMEWORK

(56) References Cited

U.S. PATENT DOCUMENTS

| | | | |
|---|---|---|---|
| 9,053,124 B1* | 6/2015 | Dornquast | G06F 16/178 |
| 10,541,938 B1* | 1/2020 | Timmerman | H04L 43/065 |
| 11,032,146 B2* | 6/2021 | Kumarasamy | H04L 41/0846 |
| 2003/0126122 A1* | 7/2003 | Bosley | G06F 16/134 |
| 2006/0026219 A1* | 2/2006 | Orenstein | G06F 16/27 |
| 2008/0077635 A1* | 3/2008 | Sporny | G06F 16/1834 |
| 2010/0125545 A1* | 5/2010 | Navas | G06F 16/2255 707/602 |
| 2010/0228999 A1* | 9/2010 | Maheshwari | G06F 21/805 713/189 |
| 2011/0099351 A1* | 4/2011 | Condict | G06F 3/0608 711/216 |
| 2011/0191300 A1* | 8/2011 | Orenstein | G06F 16/00 707/646 |
| 2012/0078847 A1* | 3/2012 | Bryant | G06F 3/0635 707/647 |
| 2012/0254215 A1* | 10/2012 | Miyata | G06F 16/182 707/758 |
| 2013/0290249 A1* | 10/2013 | Merriman | G06F 16/273 707/610 |
| 2014/0201541 A1* | 7/2014 | Paul | G06F 21/6245 713/193 |
| 2014/0279931 A1* | 9/2014 | Gupta | G06F 16/27 707/683 |
| 2015/0154418 A1* | 6/2015 | Redberg | G06F 16/148 713/165 |
| 2015/0213049 A1* | 7/2015 | Kleiman | G06F 16/1752 707/692 |
| 2016/0292186 A1* | 10/2016 | Black | G06F 16/212 |
| 2016/0328162 A1* | 11/2016 | Hayes | G06F 3/0688 |
| 2017/0331679 A1* | 11/2017 | Whittaker | H04L 41/0803 |
| 2018/0157752 A1* | 6/2018 | Arikatla | G06F 16/182 |
| 2019/0114159 A1* | 4/2019 | D'Souza | G06F 8/443 |
| 2019/0179939 A1* | 6/2019 | Govindarajan | G06F 11/1474 |
| 2019/0303445 A1* | 10/2019 | Padmanabhan | G06F 16/27 |

OTHER PUBLICATIONS

Juan Benet, "IPFS—Content Addressed, Versioned, P2P File System (Draft 3)," arxiv: 1407.3561v1, Jul. 14, 2014, 11 pages.

* cited by examiner

DECENTRALIZED DATA PROTECTION SYSTEM FOR MULTI-CLOUD COMPUTING ENVIRONMENT

FIELD

The field relates generally to data protection and, more particularly, to data protection techniques in a multi-cloud computing environment.

BACKGROUND

Enterprises such as corporations typically utilize a cloud computing environment to manage their data. One or more cloud platforms that are part of this environment may be within the exclusive control and management of the enterprise, and therefore are considered "private clouds." On the other hand, the cloud computing environment can include one or more cloud platforms that can be used by multiple enterprises, and not necessarily controlled or managed by any of the multiple enterprises but rather are controlled and managed by one or more third-party cloud providers. Such cloud platforms are typically considered "public clouds." More typically, enterprises may choose to host their data (as well as applications, workloads, services, etc.) on a combination of private and public clouds that form a multi-cloud computing environment. One or more clouds may also be referred to as a "data center." Alternatively, a data center may be comprised of one or more clouds.

The emergence of multi-cloud computing environments increases the need for data protection across multiple clouds. However, attempts to provide data protection across multiple clouds using existing solutions presents significant challenges for an enterprise.

SUMMARY

Embodiments of the invention provide decentralized data protection techniques in a multi-cloud computing environment.

For example, in one embodiment, a method comprises the following steps. In a multi-cloud computing environment comprising a plurality of cloud platforms with each cloud platform comprising one or more nodes, a method maintains a decentralized metadata database framework, wherein each node comprises a decentralized metadata database component operatively coupled to each other decentralized metadata database component of the framework and wherein each of at least two of the decentralized metadata database components stores a set of metadata records corresponding to protected data stored across the plurality of cloud platforms. Further, the method manages one or more access requests directed to the protected data through one or more of the decentralized metadata database components of the framework.

Advantageously, illustrative embodiments utilize decentralized data protection techniques in a multi-cloud computing environment to overcome drawbacks associated with existing data protection approaches. For example, one or more illustrative embodiments provide a decentralized system with multiple data protection features including, but not limited to, version control, deduplication, large data set support, smart replica placement, data integrity check, replica selection for transfer and robustness to the failure of any node in the decentralized file system, to better protect the data in a multi-cloud computing environment and to better facilitate use of the data.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Environments that implement multiple cloud platforms are referred to as multi-cloud computing environments. As mentioned above, a multi-cloud computing environment employed by an enterprise may comprise two or more clouds (e.g., two or more private clouds, two or more public clouds, or a combination of one or more private clouds and one or more public clouds). The term "enterprise" as used herein is intended to be broadly construed, and may comprise, for example, one or more businesses, one or more corporations or any other one or more entities, groups, or organizations. An "entity" as illustratively used herein may be a person or system.

Illustrative embodiments provide techniques for decentralized data protection in a multi-cloud computing environment. The multi-cloud computing environment may include a wide variety of computing resources that form an information processing system. The term "computing resource," as illustratively used herein, can refer to any device, endpoint, component, element, platform, cloud, data center, storage array, client, server, gateway, or other resource, that is part of a multi-cloud computing environment associated with an enterprise.

Before describing illustrative embodiments of a decentralized data protection system, some existing solutions and their drawbacks will be described in the context of FIGS. 1 and 2.

Though public cloud providers typically provide data protection solutions in a single cloud, it is realized herein that users also want features that can protect the data across multiple clouds. In such case, the data would have resistance against failures within any single public cloud. Further, the user would be able to save cost by choosing cloud providers that best meet the user's requirements and avoid vendor lock-in, as will be further explained below. The user's tasks can also run across multiple clouds using the data protected in different clouds with maximum performance.

Traditional data protection methods using a single master node are subject to failure and cannot store data using a unified application programming interface (API) across multiple clouds. For example, Data Domain Virtual Edition (DDVE) available from Dell EMC Corporation uses different APIs provided by different public cloud platforms such as Azure from Microsoft Corporation and AWS from Amazon. Distributed file systems, for example, Hadoop Distributed File System (HDFS) from Apache Software Foundation, can provide a unified namespace for data access. However, HDFS also uses a single master node, e.g., "namenode," which has to run on one specific cloud and is subject to failure. Additionally, HDFS does not provide version control and deduplication features, which are realized herein to be important for enterprise data protection.

Figure 1:
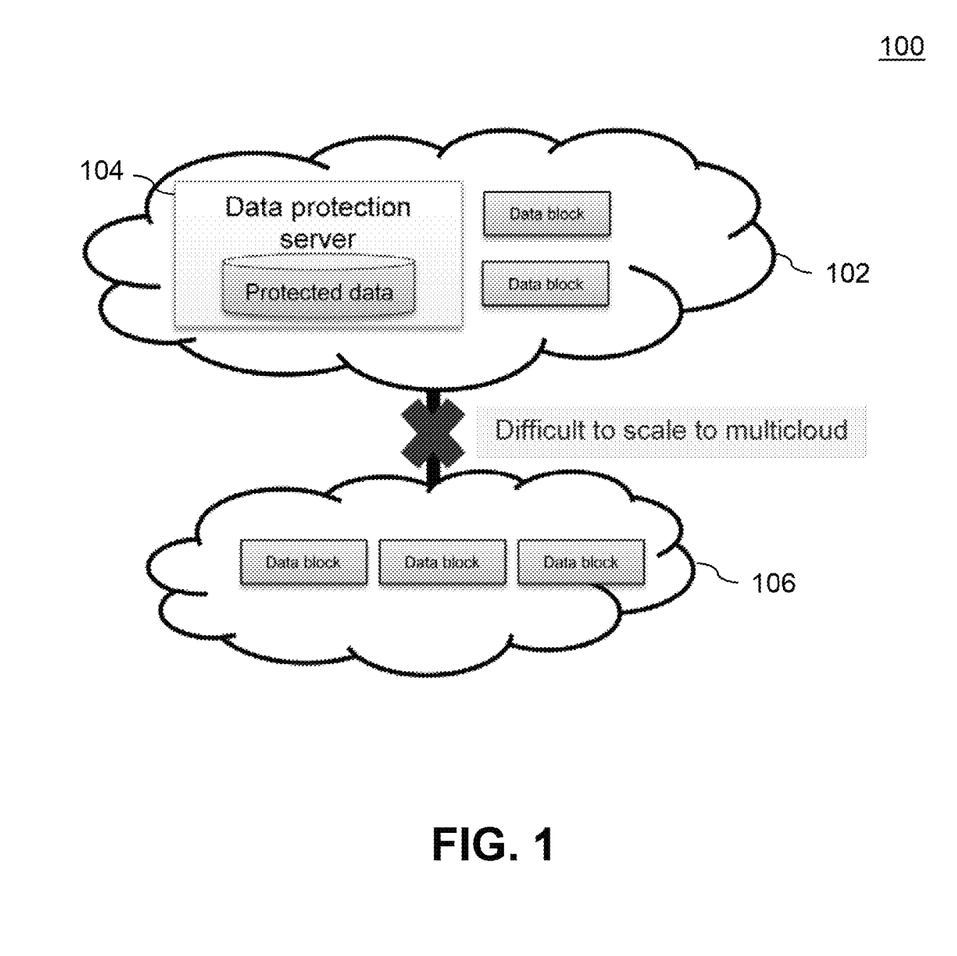
FIG. 1 illustrates an information processing system using a single cloud data protection solution.

More particularly, FIG. 1 illustrates an information processing system 100 using a single cloud data protection solution. As shown, data blocks are stored on the cloud platform denoted as cloud 102. A traditional data protection solution is deployed in cloud 102 such that all data blocks to be protected (protected data) are transferred to the data protection server 104 on the same cloud platform. Note that this solution provides similar features as the solutions used in a private data center (e.g., DDVE solution compared with a traditional Data Domain solution). The solution also has the following limitations:

(i) This kind of solution introduces a single point of failure. Once the data protection server 104 is down, human intervention is required to recover the system.

(ii) The solution cannot be easily extended to a multi-cloud computing environment (i.e., extended to cloud 106 as denoted in FIG. 1). For example, one user may have data stored across multiple clouds and due to the different APIs, one data protection server deployed in one cloud faces the difficulty of accessing and recovering the data in different clouds with different APIs.

(iii) Data protection servers deployed in a single cloud introduce the problem of vendor lock-in, i.e., the user does not have a simple way to migrate the data from one cloud to another.

Besides the traditional data protection system illustrated in FIG. 1, a distributed file system (DFS) shows the potential to support data protection in a multi-cloud computing environment. However, commonly used DFSs, such as HDFS, employ a master node to maintain metadata, which introduces a single point of failure. That is, the master node, which is the critical part of any HDFS architecture, is typically deployed in a single public cloud. Besides the single point of failure problem, the master node solution also introduces the problem of vendor lock-in. These issues are illustrated in FIG. 2.

Figure 2:
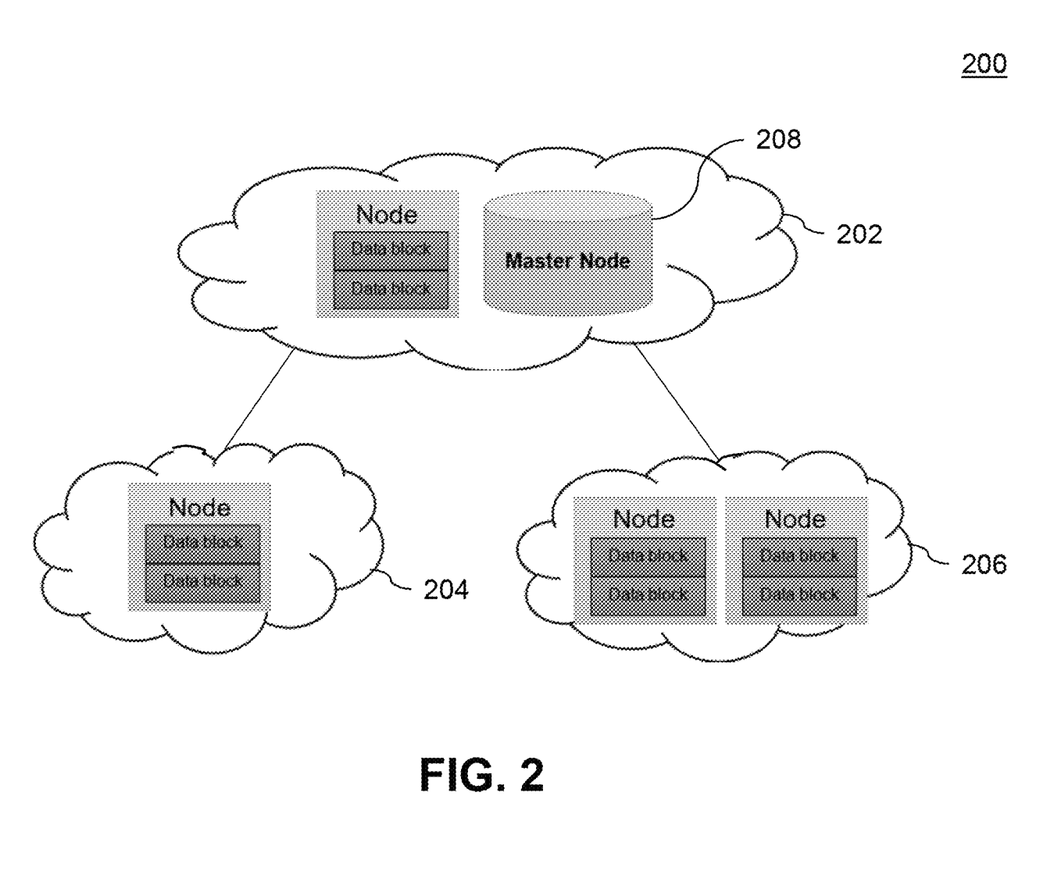
FIG. 2 illustrates an information processing system using a distributed file system data protection solution with a single master node.

More particularly, FIG. 2 illustrates an information processing system 200 using a distributed file system data protection solution with a single master node. As shown, the distributed file system comprises multiple clouds 202, 204 and 206, each with one or more nodes. Cloud 202 comprises a master node 208. When master node 208 fails, the entire distributed file system fails. Also, the fact that master node 208 resides in a single cloud (202), vendor lock-in exists.

Thus, it is realized herein that one user with multiple public cloud accounts has a need to choose freely from available cloud computing resources, based on the cost, performance, etc. The user does not want to be locked-in to one vendor. However, the traditional data protection solutions do not meet these requirements very well.

To summarize, existing data protection solutions suffer from a number of significant drawbacks:

Single Point of Failure

Traditional data protection solutions in a cloud implementation introduce a single point of failure. There is one server maintaining all the metadata such that all the actual protected data blocks are accessible using the information provided by the metadata. Once the metadata server is down, human intervention is required to recover the system.

Scale-Out

Traditional data protection does not scale-out well. One single powerful metadata server is required since adding more nodes to maintain the metadata causes performance issues.

Extending to Multiple Clouds

Data stored in multiple clouds cannot be protected in a unified manner. One data protection server deployed in one cloud cannot protect the data stored in another cloud, due to different APIs provided by the clouds.

Vendor Lock-in

Once the data protection server is deployed in one cloud, there is no simple way to migrate data to a different cloud, thus introducing the problem of vendor lock-in. The user cannot choose cloud computing services freely based on cost and performance, but rather is locked-in to the provider where the data is stored and protected.

Illustrative embodiments overcome the above and other issues by providing a decentralized data protection system in a multi-cloud computing environment, as will be described below in the context of FIGS. 3-9.

Figure 3:
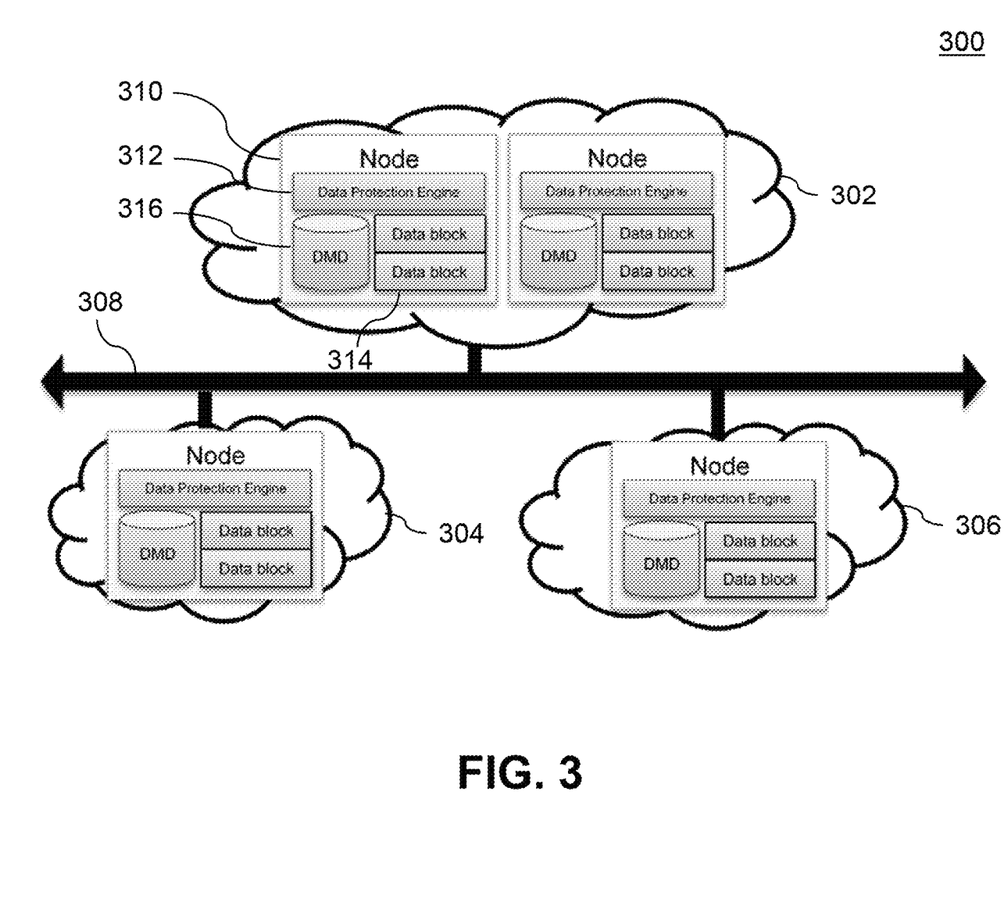
FIG. 3 illustrates an information processing system with decentralized data protection, according to an illustrative embodiment.
Figure 4:
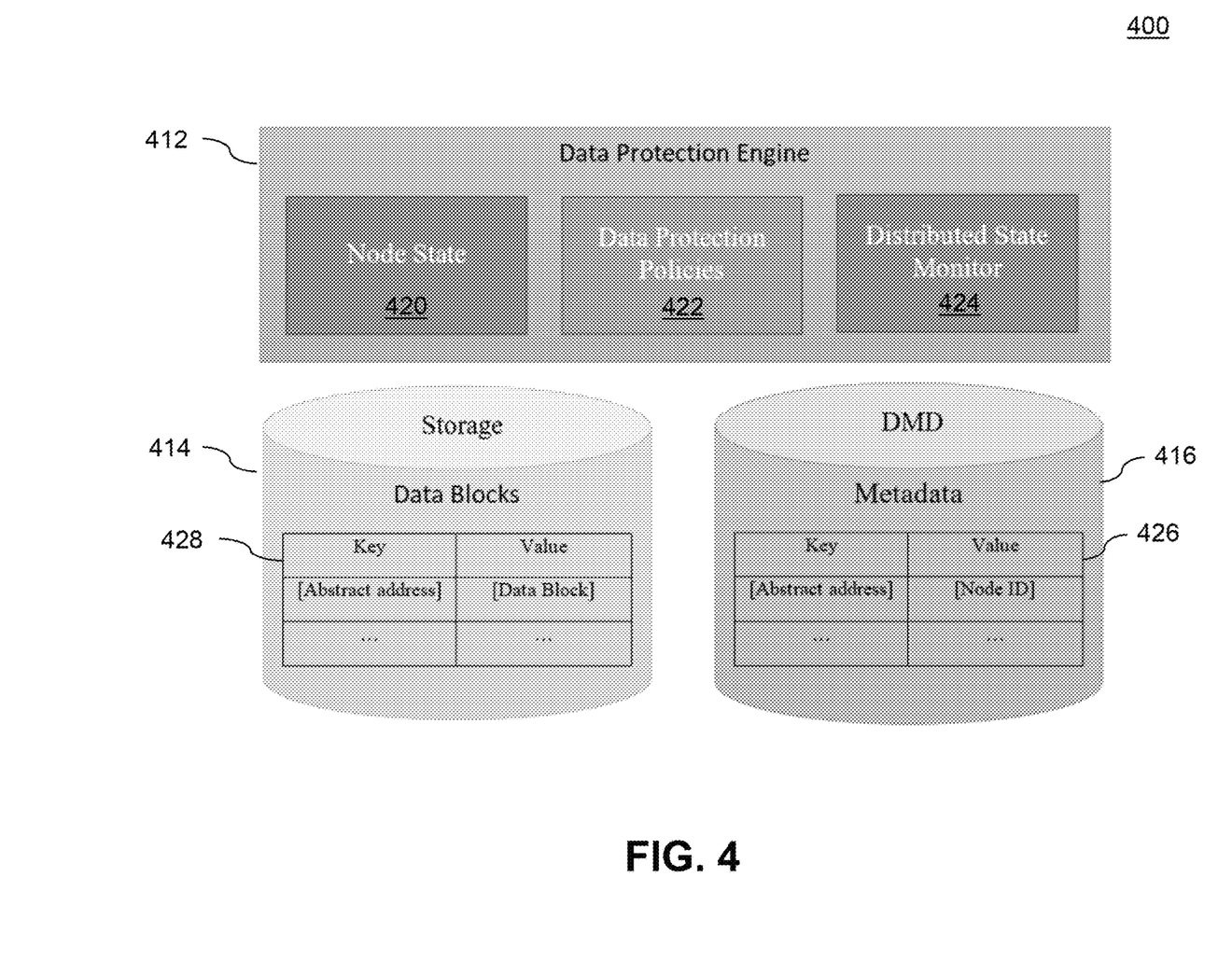
FIG. 4 illustrates a given node of an information processing system with decentralized data protection, according to an illustrative embodiment.

More particularly, according to one or more illustrative embodiments, FIG. 3 illustrates an information processing system 300 with decentralized data protection, while FIG. 4 illustrates further details of a given node 400 of information processing system 300.

As shown in FIG. 3, information processing system 300 comprises a multi-cloud computing environment with a plurality of cloud platforms, e.g., cloud 302, cloud 304 and cloud 306, each with one or more nodes. The clouds are operatively coupled via a unified message bus 308 so that data stored in one cloud is accessible from any other cloud, and thus not limited by APIs dedicated to each of the cloud vendors. Node 310 in cloud 302 is representative of the other nodes in the multi-cloud computing environment shown in FIG. 3 and comprises a data protection engine 312, data block storage 314, and a decentralized metadata database (DMD) component 316. Note that each DMD component shown on each node constitutes a DMD framework. A DMD framework maintains the metadata of all protected data blocks, so that data in any given node is accessible by any other node using a unified namespace approach. This way, access to data is not limited to a single cloud as in traditional solutions. The DMD framework itself maintains multiple replicas of each metadata record in the DMD components at each of the different nodes. Advantageously, the DMD framework does not introduce a single point of failure which, inter alia, differentiates this decentralized data protection solution from those based on traditional distributed file systems (e.g., system 200 in FIG. 2).

In FIG. 4, further details of a given node from FIG. 3 are depicted. On a single node, as shown, there are three components of the system: a data protection engine 412, data block storage 414, and a DMD component 416 (as similarly depicted in node 310 of FIG. 3). As further shown, the data protection engine 412 maintains and/or comprises a node state 420, one or more data protection policies 422, and a distributed state monitor 424. Thus, the data protection engine 412 monitors the state of the protected data and makes decisions and takes actions based on the state and policy information. Further details of each of these components will now be given.

In one or more illustrative embodiments, DMD component 416 is implemented based on the concept of a Distributed Hash Table (DHT). Records are stored based on a key-value format, i.e., table 426. Each record maps the abstract address of the data to the physical node (identified by Node ID) actually storing the data. Note that, in one or more illustrative embodiments, data blocks are also stored and addressable based on a key-value format, i.e., table 428.

In some illustrative embodiments, records in the DMD component 416 are guaranteed to be located using routing rules similar to those in a DHT, e.g., the Kademlia method as described in P. Maymounkov et al., "Kademlia: A Peer-to-Peer Information System Based on the XOR Metric." International Workshop on Peer-to-Peer Systems, pp. 53-65, Springer, Berlin, Heidelberg, March 2002, the disclosure of which is incorporated by reference herein in its entirety. Other routing methods can be used in alternative embodiments. The provision of a DMD component in each node in the multi-cloud computing environment (as illustratively depicted in each of the nodes in cloud platforms 302, 304 and 306 in FIG. 3) eliminates the need to use a single master node to store the metadata (as depicted in cloud 202 in FIG. 2). How data blocks are located based on the DMD framework is further illustrated in FIG. 5.

Figure 5:
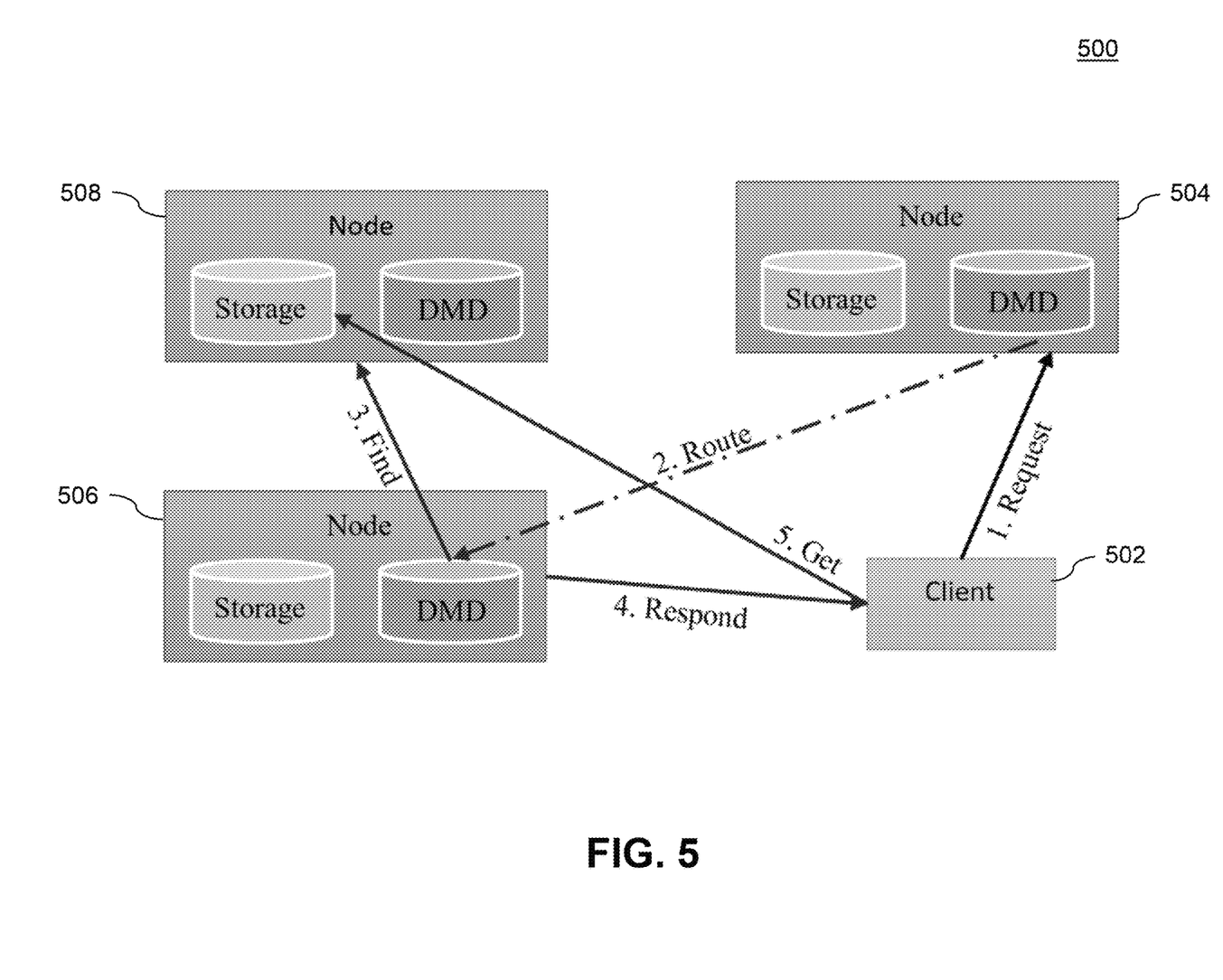
FIG. 5 illustrates a decentralized metadata database framework, according to an illustrative embodiment.

More particularly, FIG. 5 illustrates a decentralized metadata database framework 500, according to an illustrative embodiment. Any key-value based storage method can be used in the system. By way of example only, storage methods such as LevelDB and InterPlanetary File System (IPFS) may be employed in some illustrative embodiments. In one example, the IPFS system is further described in J. Benet, "IPFS—Content Addressed, Versioned, P2P File System," 2014, the disclosure of which is incorporated by reference herein in its entirety. However, illustrative embodiments are not limited to this particular data sharing system and alternative systems may be employed. Each record in the storage maps the abstract address of the data to the actual data. Large files may be chunked into small blocks, and the blocks can be saved across different nodes. As long as the record in the DMD component of each node is well maintained, all smaller data blocks can be accessed and assembled into the original larger file.

Thus, as illustrated in FIG. 5, a subset of nodes, each having a DMD component as explained above, respond to a data block access request from a client. More particularly, a client 502 requests (step 1) access to one or more data blocks that are stored in the information processing system. Assume the requested data comprises data protection copies of data blocks that are stored across multiple nodes and thus multiple cloud platforms of a multi-cloud computing environment. Thus, in this particular instance, assume the client request is received by node 504. The DMD component in node 504 routes (step 2) the client request to the DMD component of node 506. Assume the DMD component of node 506 locates (step 3) the requested data in storage at node 508. Node 506 responds (step 4) to client 502 that the data is located, and client 502 contacts node 508 to obtain (step 5) the requested data.

Node state (420 in FIG. 4) will now be illustratively described.

In one or more illustrative embodiments, each node publishes its own state so that other nodes (peers) can query and make decisions based on the published node state. By way of example, node state maintains location awareness by providing an indication of which subnet (e.g., logical subdivision of an Internet Protocol (IP) based network) and/or rack (e.g., of a server in a group of servers, each having one or more physical hardware racks) the node is running on, as well as an indication of what cloud platform it is in (e.g., AWS or Azure). Node state also provides local repository information awareness. That is, each node is aware of the state of the local repository, including the available storage space.

Figure 6A:
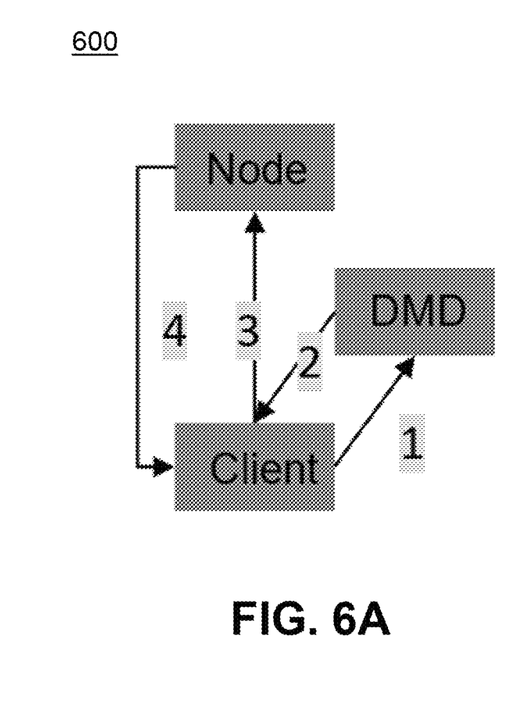
FIGS. 6A and 6B illustrate node state, according to illustrative embodiments.
Figure 6B:
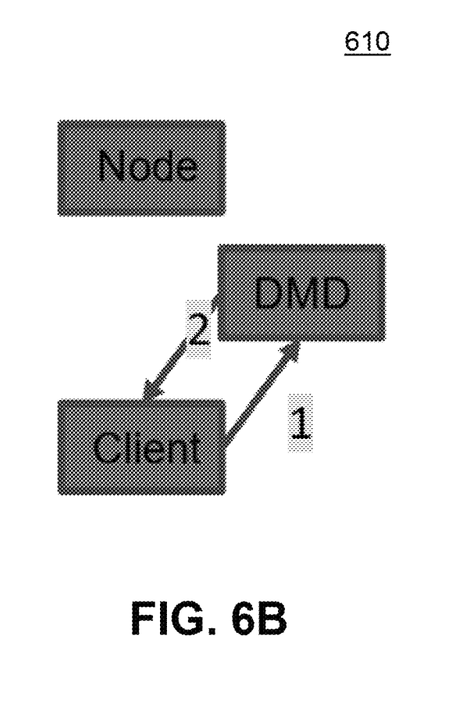

In order to ensure that the information is published to the entire distributed network of nodes, the DMD framework is employed to publish this state information. For example, in one or more illustrative embodiments, data protection engine 412 publishes the above node state through its DMD component. Node state may be stored in a small data block (relative to the protected data blocks), so that the data block can be saved inline in the DMD component. Examples of how the node states are accessed by other peers is illustrated in FIGS. 6A and 6B. For example, in an access example 600 without an inline feature shown in FIG. 6A, a client makes an access request to a DMD component and then obtains node state data from the node (data protection engine). While in an access example 610 with an inline feature shown in FIG. 6B, a client makes an access request to a DMD component and also obtains node state data from the DMD component. Thus, "inline" as illustratively used herein refers to a feature of obtaining node state data in the same data path as actual data access requests are made.

Data protection policies (422 in FIG. 4) will now be illustratively described.

In one or more illustrative embodiments, data protection policies rarely change, however, it is desirable that the policies that do change reach every node as fast as possible. Assume that a simple exemplary policy has the following data protection parameters: (i) mode: parameter that specifies protection mode such as multi-cloud mode (protected data stored across multiple clouds), same cloud mode (protected data stored in a single cloud), same data center mode (protected data stored at same data center), etc.; (ii) duplication factor: parameter that specifies number of replicas saved in the system; and (iii) interval: parameter that specifies how often each node checks the state of replicas.

Data protection policies can be issued from any node in the system. Further, in one or more illustrative embodiments, the policies are broadcasted across the entire network of nodes. Still further, new nodes joining the network receive a copy of the policies from any directly connected node, and only save the latest version.

Data and replica placement are part of the policies. With the information provided above, the node adding the block randomly chooses nodes from the DMD records maintained in its local repository (so there is no need to communicate with the entire network) or other nodes directly connected with the current node. The system also ensures that the chosen nodes have enough empty storage space and meet the replica placement policy (e.g., in which subnet or rack shall the replicas be placed). If the above method cannot find enough nodes meeting the requirement, the node broadcasts in the network to find more nodes. Whether the nodes found meet the requirement can be determined from the node state.

Placement policies can be configurable. The user can set different data protection policies. If the user wants maximum data protection capability, the data and replicas will be placed into different subnets and racks (and multiply clouds). If the user wants lowest cost and best performance, the data and replicas can be put in the same cloud (with minimum copies in multiple clouds to provide a basic multi-cloud data protection feature) and even in the same subnet. The final nodes to place the replicas are chosen based on these policies.

Distributed state monitor (424 in FIG. 4) will now be illustratively described.

During the stage of adding data into the system, in one or more illustrative embodiments, data is automatically duplicated into different nodes based on the replica placement policy described previously and the minimum duplication factor.

In one or more illustrative embodiments, every time a user or client requests data, the system at the same time checks the state of the replicas via the DMD framework. Replica state checking is important before retrieving the data, since all the replicas are used to transfer via a peer-to-peer (p2p) network. That is, these two operations can be done at the same time. By this method, the overhead of constantly checking the state of replicas is lowered.

Further, in one or more illustrative embodiments, every node in the system periodically (e.g., every 30 minutes) sends out heartbeat signals to check the state of replicas. To avoid congesting the network with too many heartbeat signals from all the nodes, if one node has received the heartbeat signal from the other node and has responded accordingly, it does not send out its own heartbeat signal in the same period. The heartbeat signal received also includes the state check query made by the data retrieving request. By this method, if the data has been retrieved recently and all the replicas are in a satisfactory state, the nodes do not send out heartbeat signals to check the state of the previously retrieved data in the next checking period.

Still further, if one node finds that the number of replicas in the system drops below the duplication factor, the node replicates its own data using the replica placement policy previously described.

The decentralized data protection system architecture described herein enables many benefits, examples of which are described below.

No Single Point of Failure

Different from traditional data protection systems, there is no single master node maintaining the metadata in the decentralized data protection system described herein, so there is no single point of failure. To achieve this, illustrative embodiments use a DMD framework, which saves all the metadata across multiple nodes (the same metadata is stored at multiple DMD components of the DMD framework). That is, the DMD framework keeps multiple replicas of each metadata record, so the DMD framework has strong resistance to the failure of any node. The DMD framework is also accessible from any node, ensuring that the actual data block is accessible.

Scale Out Support

Due to the use of the DMD framework according to illustrative embodiments, scale out is naturally supported by the decentralized data protection system. One single powerful master node is not required to maintain the metadata, since in the decentralized data protection system, metadata is decentralized and maintained in each node.

Large Data Sets Support

Any single large data set added into the decentralized data protection system is chunked into multiple small blocks. An exemplary chunking algorithm will be described below. The data block can be placed into any of the different nodes in the system across multiple clouds, so the system can support any large data set as long as the overall storage provided by the nodes in the system meets the requirement. An exemplary data block placement algorithm will also be described below.

Smart Replica Placement and Maintenance

With subnet or rack information and local repository information well maintained in a decentralized way, smart replica placement can be easily achieved in accordance with illustrative embodiments. The details are discussed above in the context of the node state description.

Smart Replica Selection and Transfer

Since, in one or more illustrative embodiments, the DMD framework keeps records using a hash digest, all the data replicas in the decentralized data protection system are accessible using the same hash digest. Since the decentralized data protection system is peer-to-peer (p2p) connected, it is not necessary to choose one replica to transfer if it is required by the user. In contrast, the user can pull all the replicas at the same time, which significantly boosts the utilization of network bandwidth and lowers the latency. Additionally, the replica selection is configurable. If the user wants to minimize the cost, the system can be tuned to block cross-cloud data transfer if a local replica is available, as per the subnet (or rack) awareness feature in the node state provided by the system.

Data Deduplication

Figure 7A:
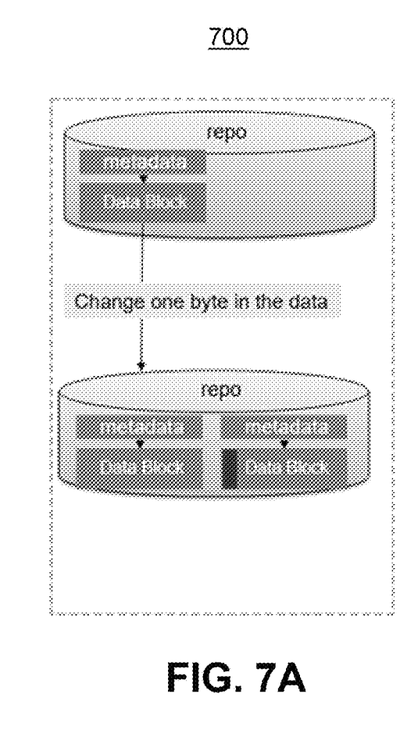
FIGS. 7A, 7B and 7C illustrate data protection features, according to illustrative embodiments.
Figure 7B:
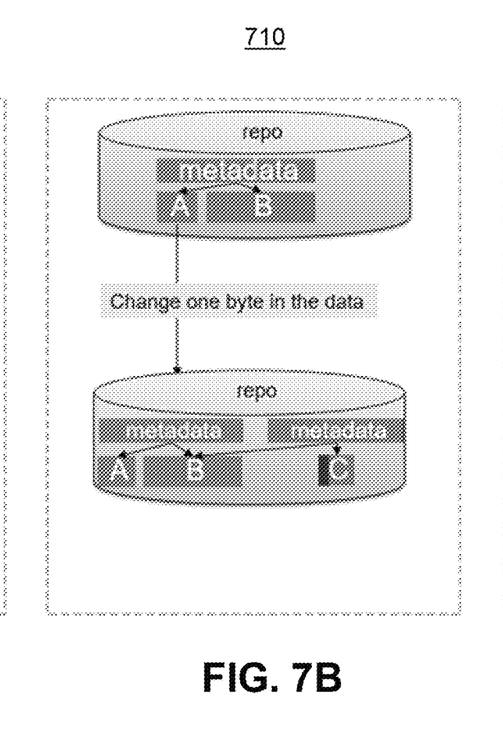
Figure 7C:
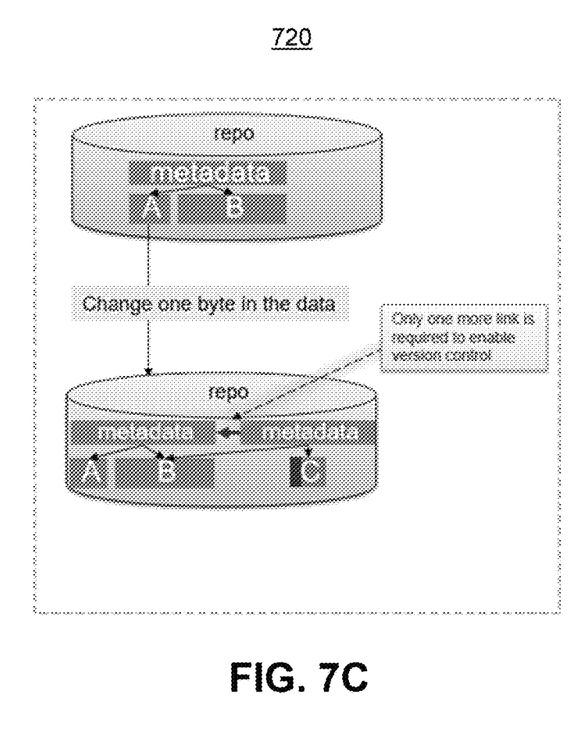

In order to support large data sets, the data is chunked into small blocks as depicted in FIGS. 7A (scenario 700) and 7B (scenario 710). Fixed size chunking is one possible solution. However, it may not provide a sufficient enough data deduplication feature. As a result, a content defined chunking (CDC) method is used in accordance with one or more illustrative embodiments. By way of example only, one implementation of the CDC is the Two Threshold Two Divisor content defined chunking algorithm. Reasons for using CDC include, but are not limited to:

(i) It helps deduplicate at the block level instead of file level in each node. Since one node may save block replicas from different files, the deduplication feature is required to save storage space in each node.

(ii) It helps locate the same content in different files, so that it provides one more level of robustness of data protection. Even if all the replicas of one file block are lost, the system provides the possibility that the same block can be found from the other files.

(iii) It directly enables a version control feature as will now be described.

Version Control

Version control is desired in most of modern data protection systems. To enable a version control feature in the decentralized data protection system described herein, CDC is used to deduplicate the data. Then, the user can add the new version of the data as usual (see scenario 720 in FIG. 7C). The system adds one hash link to the older version of the data and the system:

(i) Automatically does block level data deduplication.

(ii) Adds descriptions in the metadata of the newer version of the data. If the user so desires, the user can also add its own descriptions.

Note that this version control feature allows data blocks to be stored in different nodes in the data protection system. As such, this further differentiates the decentralized data protection system from traditional systems.

Two exemplary scenarios that can benefit from the decentralized data protection method described herein will now be described.

Data Protected in Low Cost Cloud

Assume that one cloud provides powerful and inexpensive computing resources, however, the storage cost in the same cloud is very high. On the other hand, assume there is another cloud that provides an inexpensive storage solution, however, the computing service provided by this cloud cannot meet the requirement of the tasks. If traditional data protection is employed in this scenario, the first cloud must be chosen to store the data because computing tasks can only run on this cloud. However, by using the decentralized data protection system described herein, the data can be protected and stored in the second cloud, while the tasks run in the first cloud. This configuration helps the user save cost.

Data Protected in the Private Data Center

Some users may want to keep all the data protected in their own data center. However, they also occasionally want to use one or more public clouds to do computing intensive tasks currently not supported by the private data center. By using the decentralized data protection system described herein, this scenario is supported. For example, the user can run tasks on the public cloud and configure the data protection policy that all the data block replicas should be saved in the private data center. Thus, the public cloud is used to perform computing intensive tasks while the valuable data and results are well protected in the users' private data center, where the user has full access control.

Figure 8:
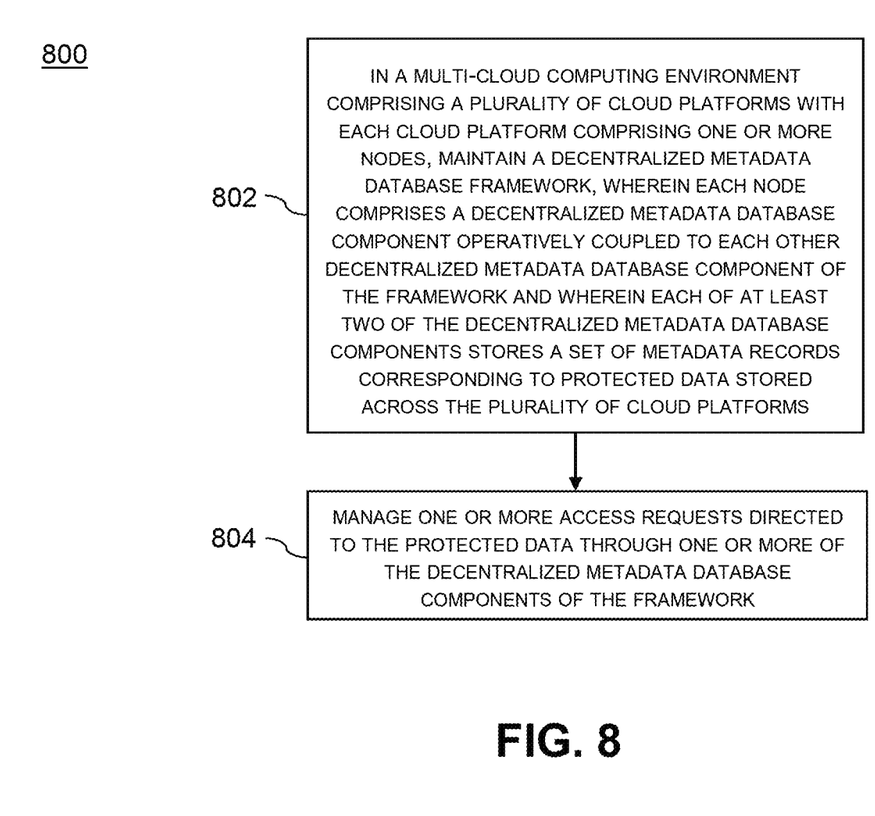
FIG. 8 illustrates a methodology for decentralized data protection in a multi-cloud computing environment, according to illustrative embodiments.

Given the illustrative description of decentralized data protection techniques herein, FIG. 8 depicts a methodology for decentralized data protection in a multi-cloud computing environment, according to an illustrative embodiment.

In FIG. 8, methodology 800 comprises the following steps. In a multi-cloud computing environment comprising a plurality of cloud platforms with each cloud platform comprising one or more nodes, step 802 maintains a decentralized metadata database framework, wherein each node comprises a decentralized metadata database component operatively coupled to each other decentralized metadata database component of the framework and wherein each of at least two of the decentralized metadata database components stores a set of metadata records corresponding to protected data stored across the plurality of cloud platforms. Further, step 804 manages one or more access requests directed to the protected data through one or more of the decentralized metadata database components of the framework.

At least portions of the decentralized data protection system in a multi-cloud computing environment shown in FIGS. 1-8 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 9.

As is apparent from the above, one or more of the processing modules or other components of the decentralized data protection system in a multi-cloud computing environment shown in FIGS. 1-8 may each run on a computer, server, storage device or other processing platform element. A given such element may be viewed as an example of what is more generally referred to herein as a "processing device." An example of such a processing platform is processing platform 900 shown in FIG. 9.

Figure 9:
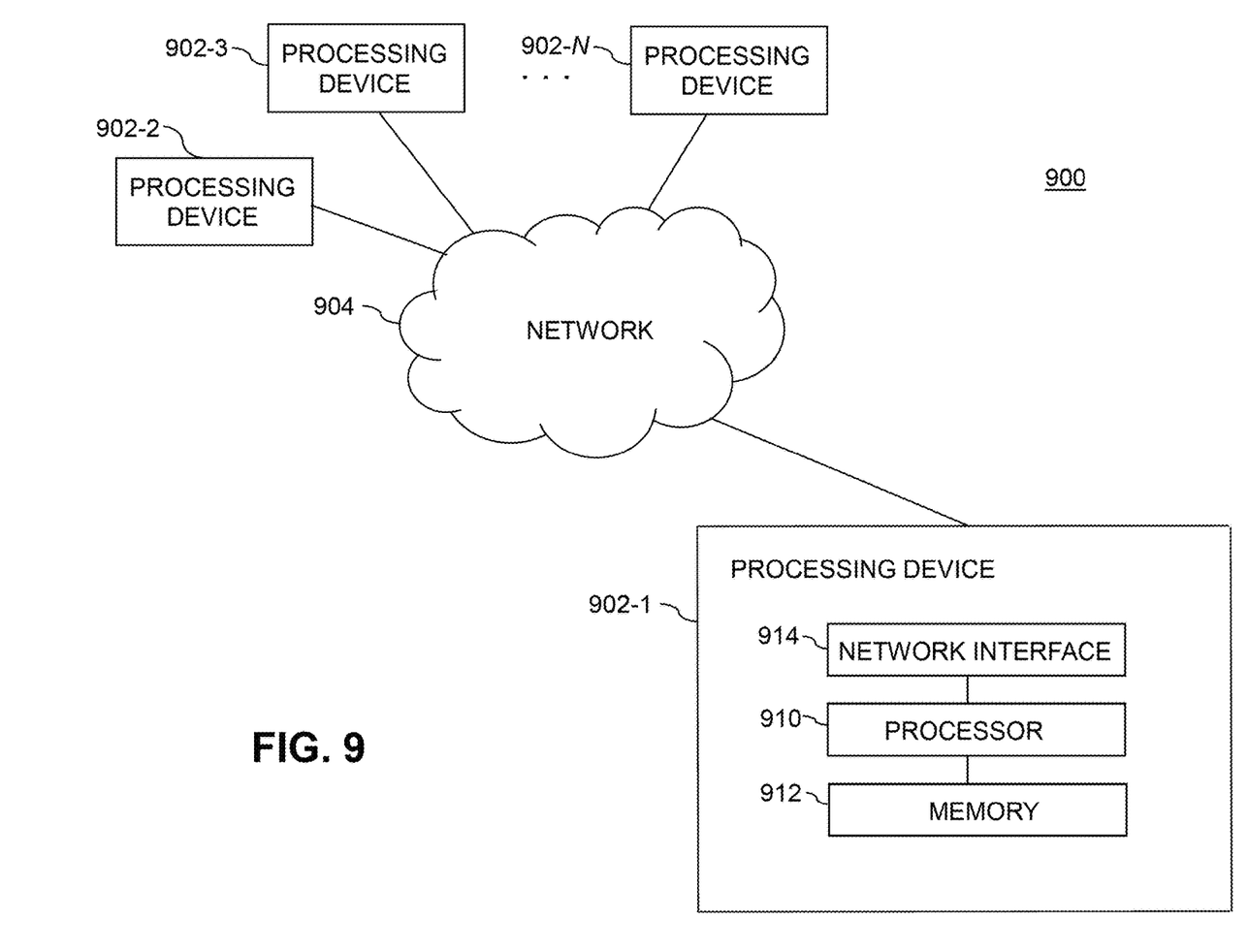
FIG. 9 illustrates a processing platform used to implement an information processing system with decentralized data protection in a multi-cloud computing environment, according to an illustrative embodiment.

The processing platform 900 in this embodiment comprises a plurality of processing devices, denoted 902-1, 902-2, 902-3, . . . 902-N, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 of the example embodiment of FIG. 9 is network interface circuitry 914, which is used to interface the processing device with the network 904 and other system components and may comprise conventional transceivers.

The other processing devices 902 of the processing platform 900 are assumed to be configured in a manner similar to that shown for processing device 902-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the decentralized data protection system in a multi-cloud computing environment. Such components can communicate with other elements of the system over any type of network or other communication media.

As indicated previously, in some embodiments, components of the decentralized data protection system in a multi-cloud computing environment as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
in a multi-cloud computing environment comprising a plurality of cloud platforms with each cloud platform comprising one or more nodes and wherein at least a subset of nodes in the multi-cloud computing environment are part of a decentralized metadata database framework;
storing, in a given decentralized metadata database component of a given node of the subset of nodes, a set of metadata records corresponding to protected data stored as replicas across the plurality of cloud platforms, wherein at least a given metadata record in the set of metadata records stored in the given decentralized metadata database component of the given node comprises metadata that is the same as at least some metadata in a metadata record stored in at least another decentralized metadata database component of another node of the subset of nodes;
maintaining, in a given data protection engine of the given node, a node state, one or more data protection policies, and a distributed state monitor, wherein: (i) in response to receipt of a protected data access request, the distributed state monitor of the given data protection engine checks the state of protected data prior to responding to the protected data access request by checking a state of one or more replicas of the protected data against the one or more data protection policies; (ii) the one or more data protection policies control placement of the one or more replicas of the protected data across the plurality of cloud platforms; (iii) the given data protection engine publishes the node state of the given node to other nodes of the subset of nodes, the node state comprising location awareness data indicating a logical subdivision and a physical location in the multi-cloud computing environment at which the given node operates; and
responding to the protected data access request by the given data protection engine of the given node, wherein responding to the protected data access request comprises causing one or more of the subset of nodes selected based at least in part on the location awareness data and the one or more data protection policies to provide at least a portion of data requested by the protected data access request;
wherein the protected data is stored in the multi-cloud environment in accordance with a content defined chunking data deduplication algorithm and a version control algorithm;

wherein the version control algorithm, responsive to adding a new version of a given file:
  initiates the content defined chunking data deduplication algorithm to perform block level data deduplication for the new version of the given file and determine one or more changed file blocks in the new version of the given file;
  generates metadata for the new version of the given file, the metadata describing the one or more changed file blocks in the new version of the given file; and
  adds a hash link from the metadata for the new version of the given file to metadata for a previous version of the given file;
wherein the given data protection engine publishes the node state of the given node to other nodes of the subset of nodes periodically utilizing one or more heartbeat check signals and responses in each of a set of two or more checking periods;
wherein the given data protection engine refrains from publishing the node state of the given node to other nodes of the subset of nodes utilizing the one or more heartbeat check signals and responses in a given one of the two or more checking periods when the node state is published in response to one or more protected data access request received by the given node during the given checking period; and
wherein the method is implemented via one or more processing devices each comprising a processor coupled to a memory.

2. The method of claim 1, wherein causing one or more of the subset of nodes selected based at least in part on the location awareness data and the one or more data protection policies to provide at least a portion of data requested by the protected data access request comprises causing the given node to provide said at least a portion of the data requested by the protected data access request.

3. The method of claim 1, wherein causing one or more of the subset of nodes selected based at least in part on the location awareness data and the one or more data protection policies to provide at least a portion of data requested by the protected data access request comprises causing at least one node other than the given node to provide said at least a portion of the data requested by the protected data access request.

4. The method of claim 1, wherein causing one or more of the subset of nodes selected based at least in part on the location awareness data and the one or more data protection policies to provide at least a portion of data requested by the protected data access request comprises causing the given node to provide a first portion of the data requested by the protected data access request and causing at least one node other than the given node to provide at least a second portion of the data requested by the protected data access request.

5. The method of claim 1, wherein the one or more of the subset of nodes is further selected based at least in part on a replica selection policy, the replica selection policy specifying which of the one or more replicas from which to provide said at least a portion of the data requested by the protected data access request based on a location of a source of the protected data access request and locations of the one or more replicas of the protected data.

6. The method of claim 5, wherein the replica selection policy specifies that the one or more replicas from which to provide said at least a portion of the data requested by the protected data access request should be in a same cloud platform as the source of the protected data access request if available.

7. The method of claim 5, wherein the replica selection policy specifies that the one or more replicas from which to provide said at least a portion of the data requested by the protected data access request should be in at least one of a same network subnet and a same rack as the source of the protected data access request if available.

8. The method of claim 1, wherein the one or more data protection policies specify a set of data protection parameters, the set of data protection parameters comprising a data protection mode parameter specifying whether the one or more replicas of the protected data are to be stored on two or more different clouds in the multi-cloud environment, in a same cloud in the multi-cloud environment, or in a same data center of a same cloud in the multi-cloud environment.

9. The method of claim 8, wherein the set of data protection parameters further comprises a duplication factor specifying a number of the one or more replicas of the protected data to be stored in the multi-cloud environment.

10. The method of claim 9, wherein the set of data protection parameters further comprises an interval specifying how often each node of the subset of nodes checks the state of the one or more replicas of the protected data.

11. The method of claim 10, wherein the one or more data protection policies specify a set of replica placement parameters, the set of replica placement policies specifying at least one of network subnets and racks where the one or more replicas are to be stored in the multi-cloud environment.

12. The method of claim 11, wherein the distributed state monitor of the given data protection engine, in response to determining that the state of the one or more replicas of the protected data does not meet the duplication factor of the one or more data protection policies, causes creation of one or more additional replicas of the protected data at one or more locations in the multi-cloud environment that meet that set of replica placement policies.

13. The method of claim 1, wherein the protected data access request comprises a request for a first file comprising two or more file blocks, wherein at least one of the two or more file blocks is obtained from at least one replica of a second file having at least one file block that is the same as one of the two or more file blocks of the first file.

14. An article of manufacture comprising a non-transitory processor-readable storage medium having stored therein program code of one or more software programs, wherein the program code when executed by at least one processing device causes said at least one processing device to perform:
  in a multi-cloud computing environment comprising a plurality of cloud platforms with each cloud platform comprising one or more nodes and wherein at least a subset of nodes in the multi-cloud computing environment are part of a decentralized metadata database framework;
  storing, in a given decentralized metadata database component of a given node of the subset of nodes, a set of metadata records corresponding to protected data stored as replicas across the plurality of cloud platforms, wherein at least a given metadata record in the set of metadata records stored in the given decentralized metadata database component of the given node comprises metadata that is the same as at least some metadata in a metadata record stored in at least another decentralized metadata database component of another node of the subset of nodes;
  maintaining, in a given data protection engine of the given node, a node state, one or more data protection policies, and a distributed state monitor, wherein: (i) in response to receipt of a protected data access request, the distributed state monitor of the given data protection engine checks the state of protected data prior to responding to the protected data access request by checking a state of one or more replicas of the protected data against the one or more data protection policies; (ii) the one or more data protection policies control placement of the one or more replicas of the protected data across the plurality of cloud platforms; (iii) the given data protection engine publishes the node state of the given node to other nodes of the subset of nodes, the node state comprising location awareness data indicating a logical subdivision and a physical location in the multi-cloud computing environment at which the given node operates; and responding to the protected data access request by the given data protection engine of the given node, wherein responding to the protected data access request comprises causing one or more of the subset of nodes selected based at least in part on the location awareness data and the one or more data protection policies to provide at least a portion of data requested by the protected data access request;

wherein the protected data is stored in the multi-cloud environment in accordance with a content defined chunking data deduplication algorithm and a version control algorithm;

wherein the version control algorithm, responsive to adding a new version of a given file:
  initiates the content defined chunking data deduplication algorithm to perform block level data deduplication for the new version of the given file and determine one or more changed file blocks in the new version of the given file;
  generates metadata for the new version of the given file, the metadata describing the one or more changed file blocks in the new version of the given file; and
  adds a hash link from the metadata for the new version of the given file to metadata for a previous version of the given file;

wherein the given data protection engine publishes the node state of the given node to other nodes of the subset of nodes periodically utilizing one or more heartbeat check signals and responses in each of a set of two or more checking periods; and wherein the given data protection engine refrains from publishing the node state of the given node to other nodes of the subset of nodes utilizing the one or more heartbeat check signals and responses in a given one of the two or more checking periods when the node state is published in response to one or more protected data access request received by the given node during the given checking period.

15. The article of manufacture of claim 14, wherein the one or more of the subset of nodes is further selected based at least in part on a replica selection policy, the replica selection policy specifying which of the one or more replicas from which to provide said at least a portion of the data requested by the protected data access request based on a location of a source of the protected data access request and locations of the one or more replicas of the protected data.

16. The article of manufacture of claim 14, wherein the protected data access request comprises a request for a first file comprising two or more file blocks, and wherein at least one of the two or more file blocks is obtained from at least one replica of a second file having at least one file block that is the same as one of the two or more file blocks of the first file.

17. A system comprising:
one or more processing devices including a processor coupled to memory and configured to:
in a multi-cloud computing environment comprising a plurality of cloud platforms with each cloud platform comprising one or more nodes and wherein at least a subset of nodes in the multi-cloud computing environment are part of a decentralized metadata database framework;
storing, in a given decentralized metadata database component of a given node of the subset of nodes, a set of metadata records corresponding to protected data stored as replicas across the plurality of cloud platforms, wherein at least a given metadata record in the set of metadata records stored in the given decentralized metadata database component of the given node comprises metadata that is the same as at least some metadata in a metadata record stored in at least another decentralized metadata database component of another node of the subset of nodes;
maintaining, in a given data protection engine of the given node, a node state, one or more data protection policies, and a distributed state monitor, wherein: (i) in response to receipt of a protected data access request, the distributed state monitor of the given data protection engine checks the state of protected data prior to responding to the protected data access request by checking a state of one or more replicas of the protected data against the one or more data protection policies; (ii) the one or more data protection policies control placement of the one or more replicas of the protected data across the plurality of cloud platforms; (iii) the given data protection engine publishes the node state of the given node to other nodes of the subset of nodes, the node state comprising location awareness data indicating a logical subdivision and a physical location in the multi-cloud computing environment at which the given node operates; and
responding to the protected data access request by the given data protection engine of the given node, wherein responding to the protected data access request comprises causing one or more of the subset of nodes selected based at least in part on the location awareness data and the one or more data protection policies to provide at least a portion of data requested by the protected data access request;
wherein the protected data is stored in the multi-cloud environment in accordance with a content defined chunking data deduplication algorithm and a version control algorithm;
wherein the version control algorithm, responsive to adding a new version of a given file:
  initiates the content defined chunking data deduplication algorithm to perform block level data deduplication for the new version of the given file and determine one or more changed file blocks in the new version of the given file;
  generates metadata for the new version of the given file, the metadata describing the one or more changed file blocks in the new version of the given file; and
  adds a hash link from the metadata for the new version of the given file to metadata for a previous version of the given file;
wherein the given data protection engine publishes the node state of the given node to other nodes of the subset of nodes periodically utilizing one or more heartbeat check signals and responses in each of a set of two or more checking periods; and wherein the given data protection engine refrains from publishing the node state of the given node to other nodes of the subset of nodes utilizing the one or more heartbeat check signals and responses in a given one of the two or more checking periods when the node state is published in response to one or more protected data access request received by the given node during the given checking period.

18. The system of claim 17, wherein the one or more of the subset of nodes is further selected based at least in part on a replica selection policy, the replica selection policy specifying which of the one or more replicas from which to provide said at least a portion of the data requested by the protected data access request based on a location of a source of the protected data access request and locations of the one or more replicas of the protected data.

19. The system of claim 17, wherein the protected data access request comprises a request for a first file comprising two or more file blocks, and wherein at least one of the two or more file blocks is obtained from at least one replica of a second file having at least one file block that is the same as one of the two or more file blocks of the first file.

20. The system of claim 17, wherein at least one of the one or more changed file blocks in the new version of the given file is stored in a first subset of the plurality of cloud platforms, wherein at least one unchanged file block in the new version of the given file is stored in a second subset of the plurality of cloud platforms, and wherein the second subset of the plurality of cloud platforms is different than the first subset of the plurality of cloud platforms.

* * * * *